United States Patent
Jin et al.

(10) Patent No.: US 11,180,623 B2
(45) Date of Patent: Nov. 23, 2021

(54) FLEXIBLE CONDUCTIVE FILM AND ITS PREPARATION METHOD

(71) Applicant: SHENZHEN HUAKE-TEK CO., LTD., Shenzhen (CN)

(72) Inventors: Shidong Jin, Shenzhen (CN); Xiping Zeng, Shenzhen (CN); Haibo Wang, Shenzhen (CN); Jianlong Kang, Shenzhen (CN); Xiaoming Li, Shenzhen (CN)

(73) Assignee: SHENZHEN HUAKE-TEK CO., LTD., Shenzhen (CN)

( * ) Notice: Subject to any disclaimer, the term of this patent is extended or adjusted under 35 U.S.C. 154(b) by 0 days.

(21) Appl. No.: 17/252,743

(22) PCT Filed: Sep. 27, 2018

(86) PCT No.: PCT/CN2018/107805
§ 371 (c)(1),
(2) Date: Dec. 16, 2020

(87) PCT Pub. No.: WO2020/037768
PCT Pub. Date: Feb. 27, 2020

(65) Prior Publication Data
US 2021/0179796 A1 Jun. 17, 2021

(30) Foreign Application Priority Data
Aug. 18, 2018 (CN) .......................... 201810943686.6

(51) Int. Cl.
| | |
|---|---|
| *C08J 7/044* | (2020.01) |
| *C09D 1/00* | (2006.01) |
| *H01B 1/02* | (2006.01) |
| *C08J 7/04* | (2020.01) |
| *B05D 1/26* | (2006.01) |
| *B05D 3/02* | (2006.01) |
| *B05D 3/04* | (2006.01) |
| *B05D 3/06* | (2006.01) |
| *B05D 7/24* | (2006.01) |
| *B05D 7/00* | (2006.01) |
| *C08J 7/06* | (2006.01) |
| *C08K 3/22* | (2006.01) |
| *H01B 5/02* | (2006.01) |
| *B82Y 30/00* | (2011.01) |
| *B82Y 40/00* | (2011.01) |

(52) U.S. Cl.
CPC .............. *C08J 7/0423* (2020.01); *B05D 1/26* (2013.01); *B05D 3/0263* (2013.01); *B05D 3/0281* (2013.01); *B05D 3/0473* (2013.01); *B05D 3/065* (2013.01); *B05D 7/24* (2013.01); *B05D 7/546* (2013.01); *C08J 7/044* (2020.01); *C08J 7/06* (2013.01); *C08K 3/22* (2013.01); *C09D 1/00* (2013.01); *H01B 1/02* (2013.01); *H01B 5/02* (2013.01); *B05D 2201/02* (2013.01); *B82Y 30/00* (2013.01); *B82Y 40/00* (2013.01); *C08J 2323/08* (2013.01); *C08J 2333/02* (2013.01); *C08K 2003/2241* (2013.01); *C08K 2201/011* (2013.01)

(58) Field of Classification Search
CPC .... H05K 1/02; H01B 1/22; C09D 1/00; C08J 7/044
See application file for complete search history.

(56) References Cited

U.S. PATENT DOCUMENTS

| | | | | |
|---|---|---|---|---|
| 6,372,324 | B1 * | 4/2002 | Fujii | ......................... C08J 5/18 |
| | | | | 428/141 |
| 2015/0111048 | A1 * | 4/2015 | Kim | .................... C09B 67/0038 |
| | | | | 428/457 |
| 2018/0019038 | A1 * | 1/2018 | Tsuchiya | .................. H01B 1/22 |

FOREIGN PATENT DOCUMENTS

| | | | | |
|---|---|---|---|---|
| CA | 2582903 | A1 * | 10/2007 | ............. B29C 48/29 |
| CN | 103342854 | A | 10/2013 | |
| CN | 105093638 | A | 11/2015 | |
| CN | 107230517 | A | * 10/2017 | ............... C08J 7/04 |
| CN | 107230517 | A | 10/2017 | |
| JP | 2004292793 | A | * 10/2004 | |
| WO | 2005118735 | A1 | 12/2005 | |

OTHER PUBLICATIONS

Hahladakis, J. N.; Velis, C. A.; Weber, R.; Iacovidou, E.; Purnell, P. An Overview of Chemical Additives Present in Plastics: Migration, Release, Fate and Environmental Impact during Their Use, Disposal and Recycling. Journal of Hazardous Materials 2017, 344, 179-199. (Year: 2017).*
International Search Report issued in corresponding International application No. PCT/CN2018/107805, dated Apr. 15, 2019.
Written Opinion of the International Searching Authority for No. PCT/CN2018/107805.
Initial Publication For PCT/CN2018/107805.

* cited by examiner

Primary Examiner — Khanh T Nguyen

(57) ABSTRACT

A flexible conductive film is comprised of a flexible base and a conductive layer coated on it. The flexible base uses Surlyn resin as the matrix. It uses silver nanowire as the conductive layer.

7 Claims, No Drawings

FLEXIBLE CONDUCTIVE FILM AND ITS PREPARATION METHOD

This publication is made based on the Chinese patent application CN201810943686.6 filed on Aug. 18, 2018 with patent priority claimed, the full content of which is incorporated for reference herein.

FIELD OF THE INVENTION

This invention relates to the field of conductive films, especially to one kind of flexible conductive film and its preparation method.

BACKGROUND OF THE INVENTION

Transparent conductive films are one kind of thin films that can conduct electricity, and are widely used in LCD, solar cells, photo electron and various fields of optics for its lightweight, flexibility, breakage-proof, and other advantages. At present, the widest used transparent conductive films are prepared on PET (polyethylene terephthalate), PMMA (polymethyl methacrylate), TAC (Triacetyl Cellulose), COP (Cyclo Olefin Polymers), glass, porcelain or other rigid bases. Due to defects like rigidity and deformation resistance, such materials will break, fracture, or become brittle after being bent for over 100,000 times with a radius of 2 mm, which restricts their usage in transparent conductive films.

ITO (Indium tin oxide), as conductive materials traditionally used in touch screens, boasts great optical-electrical characteristics, but is not suitable for usage in flexible touch control products due to its poor flexibility and resistance to bending. In recent years, various materials have emerged to replace ITO, such as silver nanowire, gold nanowire, nickel nanowire, silver nanoparticle, copper nanoparticle, nickel nanoparticle, graphene, and conductive polymer (PEDOT/PSS, Poly(3,4-ethylenedioxythiophene)/poly(styrene sulfonate)). Among them, silver nanowire features excellent electrical conductivity and flexibility of silver and is cheap for its abundant source of raw materials. Moreover, with even and controllable shape and appearance, and high aspect ratio, silver nanowire is the best choice to make transparent electrodes for super large and flexible touch screens and has started to replace ITO (Indium tin oxide) in some applications and been put into industrialization production.

Due to flexible electronics' functional needs for flexibility, the characteristics of rigid base materials and ITO bending and cracking under stress create a bottleneck for its application in flexible electronic components. Therefore, it is a major technical topic in this field to provide one kind of transparent film of great flexibility and electrical conductivity.

SUMMARY OF THE INVENTION

This invention provides one type of conductive film of great flexibility and electrical conductivity and its preparation method, given poor resistance to bending of existing rigid base materials and insufficient flexibility of ITO.

This invention uses the below technical scheme:

One type of flexible conductive film, which consists of flexible base and conductive film applied on it. The flexible base is made up of the below components, with each's part by weight defined as below:
Water-based medium, 70-90;
Surlyn resin, 5-20;
Antioxidant, 1-5;
Levelling agent, 0.5-2;
Functional particle, 0.1-0.5;
Defoamer, 1-2;
And, the flexible base is 20-50 μm thick.

And, the functional particle is one type of inorganic nanoparticle, any of nano $TiO_2$, nano ZnO, nano $SiO_2$, and nano $CeO_2$. Add functional particles and make nano materials and Surlyn resin into a composite featuring flexibility, impact toughness, and resistance to abrasion, scratch, and chemicals. The preferred functional particle is nano $TiO_2$.

Specifically, the water-based medium is water with resistance up to 18 MΩ*cm (25° C.), mainly used as solvent. The Surlyn resin is Surlyn resin group produced by DuPont, characterized by high transparency, and resistance to bending and chemicals, used as matrix resin for film formation. The preferred type is DuPont nucleating agent SURLYN HPD3001. The antioxidant is phosphite ester used together with phenol antioxidants, which is able to avoid oxidation coloring to flexible films made of Surlyn resin as matrix. The preferred antioxidant is antioxidant 168 (Tns-(2,4-di-tert-butyl)-phosphite) used together with phenol antioxidant 1790, with mass ratio 1 to 3. The levelling agent is water-based, with BYK333 preferred. The defoamer is an organic silicon defoamer.

Compared with transparent conductive films made with rigid bases, those made with flexible bases featuring Surlyn resin as matrix don't only have identical optical-electrical characteristics, but also boast many unique advantages, such as flexibility, light weight, breaking resistance, and capability of being produced in reel-to-reel continuous commercial process.

And, the conductive layer is conductive pulps coated and cured on the flexible base. The conductive pulp is any one or several mixed from silver nanowire, gold nanowire, copper nanowire, nickel nanowire, silver nanoparticle, gold nanoparticle, copper nanoparticle, and nickel nanoparticle.

And, the conductive layer is silver nanowire as conductive pulp coated and cured on the flexible base.

And, the silver nanowire pulps contain 0.1-0.5% silver nanowire, with diameter 10-100 nm and aspect ratio ≥1000.

This invention also provides a method to prepare flexible conductive films, including the following steps:
(1) Weigh and take raw materials for the flexible base as per parts by weight, add the water-based medium into a 3-neck flask, heat to slightly boil, and add Surlyn resin while stirring at 100-200 rpm. After Surlyn resin dissolves, add antioxidants, levelling agents, functional particles, and defoamers in turn, continue to stir for 2-2.5 h until well mixed, to make flexible base coating liquid;
(2) Apply the flexible base coating liquid prepared in Step (1) onto the carrier film in slot die coating way, at the speed of 10-20 m/min, and cure to make a flexible base;
(3) Apply the conductive pulp evenly onto the flexible base in slot die coating way, at the speed of 10-20 m/min, and cure at 70-130° C., to make a conductive layer;
(4) Remove the cured flexible base and conductive layer from the carrier film using laser, to make a flexible conductive film.

And, in Step (2), the flexible base is cured with hot wind or far infrared or electrical heating. The preferred curing way is combined use of wind and electrical heating.

And, hot wind heating temperature is 50-100° C., and electrical heating is 80-130° C.

And, the flexible base coating liquid in Step (1) has viscosity of 5-30 mpa·s and surface tension of 20-40 mN/m.

Specifically, the carrier film is a rigid base acting as a carrier in the process of preparing flexible conductive films, such as PET (polyethylene terephthalate), PMMA (polymethyl methacrylate), COP (Cyclo Olefin Polymers), mainly 100-188 μm thick. The preferred carrier film is PET (polyethylene terephthalate) 188 μm thick.

In this invention, the flexible conductive film uses Surlyn resin as matrix to replace rigid bases for touch control. The film it forms into boasts great resistance to solvents, corrosion, and chemicals, rigidity, and flexibility. Add functional particles and make nano materials and Surlyn resin into a composite featuring flexibility, impact toughness, and resistance to abrasion, scratch, and chemicals.

The conductive film preparation method in this intervention is simple. It makes flexible base coating liquid by mixing and stirring, and then coats and cures in the slot die coating way. The flexible conductive film made using rigid carrier film features great resistance to bending and cracking and shows no crack or fracture on the surface after being bent for 200,000 to 500,000 times, with electrical resistance change rate below 5%. Besides, it is also characterized by great flexibility and conductivity.

DETAILED DESCRIPTION OF THE PREFERRED EMBODIMENTS

Please find below a clear and comprehensive description of the technical scheme of this invention with an embodiment. Apparently, the embodiment described represents only some, not all embodiments. Based on embodiments in this invention, all other embodiments obtained by those skilled in this art not through creative work fall into the scope of protection of this invention.

Embodiment 1

A type of flexible conductive film, which consist of a flexible base and a conductive layer coated on it. The flexible base is comprised of below components with below parts by weight:
Ultra-pure water, 70;
Surlyn resin, 5;
Antioxidant, 1;
Leveling agent, 0.5;
Functional particle, 0.1;
Defoamer, 1.

The flexible conductive film preparation method in this embodiment includes the following steps:
(1) Weigh and take raw materials of the flexible base as per parts by weight, add ultra-pure water into a 3-neck flask, heat to slightly boil, and add Surlyn resin while stirring at 100 rpm. After Surlyn resin dissolves, add antioxidants, leveling agents, functional particles, and defoamers in turn, continue to stir for 2 h until well mixed, to make flexible base coating liquid for usage in the following steps;
(2) Unreel 188 μm thick PET (polyethylene terephthalate) at 100 m/min and conduct corona treatment on PET (polyethylene terephthalate) base film with 1.0 kw power; apply the flexible base coating liquid prepared in Step (1) on one side of the corona treated PET (polyethylene terephthalate) in the die coating way, at the flow of 50 ml/min and speed of 10 m/min; cure with hot wind at 50° C., or electrical heating at 130° C., for 2 min, to make flexible bases 20 μm thick;
(3) Apply silver nanowire conductive pulps evenly on the surface of flexible bases in the die coating way, with pump speed 30 ml/min, wet film thickness 30 μm, application speed 10 m/min, curing temperature gradually increasing from 70° C. to 130° C. for 2 min, to form an even conductive layer;
(4) Remove the cured flexible base and conductive layer from the carrier film using laser, to obtain a flexible conductive film.

Conduct a weathering test on the flexible conductive film made in this embodiment under the following test conditions:
UV (Ultraviolet rays) resistance test: irradiation intensity 0.35 W/M$^2$, temperature 60° C., duration 240 h;
Xenon weathering test: irradiation intensity 0.8 W/M$^2$, temperature 40° C., humidity 55%, duration 240 h;
High temperature and humidity test: temperature 85° C., humidity 85%, duration 240 h;
Thermal shock test: low temperature −30° C., high temperature 90° C., duration 240 h. The weathering test results are shown in Table 1.

TABLE 1

Flexible conductive film weathering test results

| Weathering test | UV resistance | Xenon weathering test | High temperature and humidity | Thermal shock |
|---|---|---|---|---|
| Resistance R (%) | 0.5-1.0 | 0.5-1.0 | 0.5-1.0 | 0.5-1.0 |
| Transmittance (%) | 0.2-0.8 | 0.2-0.8 | 0.2-0.8 | 0.2-0.8 |
| Haze (%) | 0.1-0.3 | 0.1-0.3 | 0.1-0.3 | 0.1-0.3 |
| Aberration b (%) | 0.1-0.4 | 0.1-0.4 | 0.1-0.4 | 0.1-0.4 |
| Adhesion | 100/100 | 100/100 | 100/100 | 100/100 |
| Resistance to chemicals (ΔR/R, %) | <8 | <10 | <10 | <10 |

Embodiment 2

One type of flexible conductive film, which consists of a flexible base and a conductive layer applied on it. The flexible base is comprised of below components with below parts by weight:
Ultra-pure water, 80;
Surlyn resin, 15;
Antioxidant, 3;
Leveling agent, 1.5;
Functional particle, 0.3;
Defoamer, 1.5.

The flexible conductive film preparation method in this embodiment includes the following steps:
(1) Weigh and take raw materials of the flexible base as per parts by weight, add ultra-pure water into a 3-neck flask, heat to slightly boil, and add Surlyn resin while stirring at 150 rpm. After Surlyn resin dissolves, add antioxidants, leveling agents, functional particles, and defoamers in turn, continue to stir for 2.5 h until well mixed, to make flexible base coating liquid;
(2) Unreel 188 μm thick PET (polyethylene terephthalate) at 100 m/min and conduct corona treatment on PET (polyethylene terephthalate) base film with 1.0 kw power; apply the flexible base coating liquid prepared in Step (1) on one side of the corona treated PET (polyethylene terephthalate) in the die coating way, at the flow of 30 ml/min and speed of 15 m/min; cure with hot wind at 80° C., or electrical heating at 100° C., for 1.5 min, to make flexible bases 30 μm thick;

(3) Apply silver nanowire conductive pulps evenly on the surface of flexible bases in the die coating way, with pumping speed 30 ml/min, wet film thickness 30 μm, application speed 10 m/min, curing temperature gradually increasing from 70° C. to 130° C. for 2 min, to form an even conductive layer;

(4) Remove the cured flexible base and conductive layer from the carrier film using laser, to obtain a flexible conductive film.

Conduct a weathering test on the flexible conductive film made in this embodiment under the same test conditions as embodiment 1.

The test results are shown in Table 2.

TABLE 2

Flexible conductive film weathering test results

| Weathering test | UV resistance | Xenon weathering test | High temperature and humidity | Thermal shock |
|---|---|---|---|---|
| Resistance R (%) | 0.5-1.0 | 0.5-1.0 | 0.5-1.0 | 0.5-1.0 |
| Transmittance (%) | 0.2-0.8 | 0.2-0.8 | 0.2-0.8 | 0.2-0.8 |
| Haze (%) | 0.1-0.3 | 0.1-0.3 | 0.1-0.3 | 0.1-0.3 |
| Aberration b* (%) | 0.1-0.4 | 0.1-0.4 | 0.1-0.4 | 0.1-0.4 |
| Adhesion | 100/100 | 100/100 | 100/100 | 100/100 |
| Resistance to chemicals (ΔR/R, %) | <8 | <10 | <10 | <10 |

Embodiment 3

A type of flexible conductive film, which consists of a flexible base and a conductive layer coated on it. The flexible base is comprised of below components with below parts by weight:

Ultra-pure water, 90;
Surlyn resin, 20;
Antioxidant, 5;
Leveling agent, 2;
Functional particle, 0.5;
Defoamer, 2.

The flexible conductive film preparation method in this embodiment includes the following steps:

(1) Weigh and take raw materials of the flexible base as per parts by weight, add ultra-pure water into a 3-neck flask, heat to slightly boil, and add Surlyn resin while stirring at 200 rpm. After Surlyn resin dissolves, add antioxidants, leveling agents, functional particles, and defoamers in turn, continue to stir for 2 h until well mixed, to make flexible base coating liquid;

(2) Unreel 188 μm thick PET (polyethylene terephthalate) at 100 m/min and conduct corona treatment on PET (polyethylene terephthalate) base films with 1.0 kw power; apply the flexible base coating liquid prepared in Step (1) on one side of the corona treated PET (polyethylene terephthalate) in the die coating way, at the flow of 50 ml/min and speed of 20 m/min; cure with hot wind at 100° C., or electrical heating at 80° C., for 1 min, to make flexible bases 50 μm thick;

(3) Apply silver nanowire conductive pulp evenly on the surface of flexible base in the die coating way, with pump speed 30 ml/min, wet film thickness 30 μm, application speed 10 m/min, curing temperature gradually increasing from 70° C. to 130° C. for 2 min, to form an even conductive layer;

(4) Remove the cured flexible base and conductive layer from the carrier film using laser, to obtain a flexible conductive film.

Conduct a weathering test on the flexible conductive film made in this embodiment under the same test conditions as embodiment 1. The test results are shown in Table 3.

TABLE 3

Flexible conductive film weathering test results

| Weathering test | UV resistance | Xenon weathering test | High temperature and humidity | Thermal shock |
|---|---|---|---|---|
| Resistance R (%) | 0.5-1.0 | 0.5-1.0 | 0.5-1.0 | 0.5-1.0 |
| Transmittance (%) | 0.2-0.8 | 0.2-0.8 | 0.2-0.8 | 0.2-0.8 |
| Haze (%) | 0.1-0.3 | 0.1-0.3 | 0.1-0.3 | 0.1-0.3 |
| Aberration b* (%) | 0.1-0.4 | 0.1-0.4 | 0.1-0.4 | 0.1-0.4 |
| Adhesion | 100/100 | 100/100 | 100/100 | 100/100 |
| Resistance to chemicals (ΔR/R, %) | <8 | <10 | <10 | <10 |

Comparative Embodiment 1

In this comparative embodiment, the conductive film uses 50 μm thick PET as base, on which silver nanowire conductive pulps are applied evenly in the die coating way, with pumping speed 30 ml/min, wet film thickness 30 μm, application speed 10 m/min, curing temperature gradually increasing from 70° C. to 130° C. for 2 min, to form an even conductive layer. In this way, a transparent conductive film is made.

Conduct an optical performance test on flexible conductive films made in embodiments 1-3 and come up with results shown in Table 4.

TABLE 4

Flexible conductive film optical performance test result

| Optical property | Embodiment 1 | Embodiment 2 | Embodiment 3 |
|---|---|---|---|
| Transmittance (%) | 93.1 | 91.5 | 90.0 |
| Haze (%) | 0.12 | 0.35 | 0.5 |
| Aberration b* (%) | 0.5 | 0.8 | 1.2 |
| Refractive index (@550 nm) | | 1.71 | |
| Double refraction (Δn) | | 0.03 | |

Conduct a bending performance test on conductive films made in embodiments 1-3 and comparative embodiment 1, with R=2 mm, for 100,000 times, 200,000 times, 300,000 times, and 500,000 times respectively, and the resistance change and film surface status for each is shown in Table 5.

TABLE 5

| Bending performance test | | 100,000 times | 200,000 times | 300,000 times | 500,000 times |
|---|---|---|---|---|---|
| Resistance R (%) | Embodiment 1 | 0.2 | 0.3 | 0.35 | 0.5 |
| | Embodiment 2 | 0.2 | 0.3 | 0.35 | 0.5 |
| | Embodiment 3 | 0.25 | 0.35 | 0.45 | 0.55 |
| | Comparative example 1 | 0.5 | 5 | 20 | — |
| Film surface status | Embodiment 1 | No crack | No crack | No crack | No crack |
| | Embodiment 2 | No crack | No crack | No crack | No crack |
| | Embodiment 3 | No crack | No crack | No crack | No crack |
| | Comparative example 1 | Slight blushing | Crack | Crack | Crack and no resistance |

From Table 1-5, it can be seen that conductive films made in each embodiment of this invention, with a flexible base with Surlyn resin as matrix and highly conductive and flexible silver nanowire as a conductive layer, features great optical properties such as high transmittance, 0 haze, and low b*, able to meet demands for transparent conductive films. Besides, it features great flexibility and conductivity. After being bent for 200,000 to 500,000 times, the conductive layer shows no crack or fracture, with resistance change rate below 5%, which makes it meet demands of flexible optoelectronics on conductive films, and thus widely used in flexible electronic components. It can be also seen from the weathering test that conductive films made in the embodiment of this invention features great weather resistance, which makes it suitable for various environment and widens its scope of application.

Above are further descriptions of this invention using embodiments, but it shall be understood that such detailed descriptions shall not be considered as restrictive of nature and scope of this invention. All kinds of modifications made by those skilled in this art to the above embodiments after reading this specification fall into the scope of protection of this invention.

The invention claimed is:

1. A flexible conductive film, comprising: a flexible base film and a conductive layer coated on a surface of the flexible base film, and the flexible base film includes following parts by weight:

70-90 parts of aqueous medium;
5-20 parts of Surlyn resin compound represented by the following formula (I);

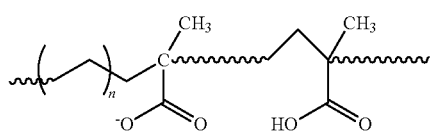

(I)

-continued

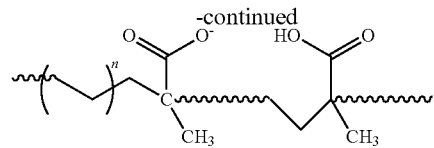

1-5 parts of antioxidants;
0.5-2 parts of a leveling agent;
0.1-0.5 parts of functional particles; and
1-2 parts of an antifoaming agent.

2. The flexible conductive film according to claim 1, wherein the flexible base film has a thickness of 20 to 50 μm.

3. The flexible conductive film according to claim 1, wherein said functional particles are nano $TiO_2$, nano ZnO, nano $SiO_2$, any one of nano-$CeO_2$ inorganic nano-filled particles.

4. The flexible conductive film according to claim 1, wherein the aqueous medium is water with a resistivity of 18 MΩ*cm at 25° C.; and the antioxidant is a compound of phosphite and phenolic antioxidants; the leveling agent is an aqueous leveling agent; the antifoaming agent is a silicone antifoaming agent.

5. The flexible conductive film according to claim 1, wherein the conductive layer is a conductive paste coated and cured on a surface of the flexible base film, and the conductive paste is made by mixing any one or more of silver nanowires, gold nanowires, copper nanowires, nickel nanowires, silver nanoparticles, gold nanoparticles, copper nanoparticles, and nickel nanoparticles.

6. The flexible conductive film according to claim 5, wherein the conductive layer is a silver nanowire conductive paste coated and cured on a surface of the flexible base film.

7. The flexible conductive film according to claim 6, wherein the silver nanowire conductive paste contains 0.1-0.5% of silver nanowires, and the silver nanowires have a diameter of 10-100 nm, The aspect ratio is ≥1000.

* * * * *